United States Patent [19]

Spengler

[11] Patent Number: 4,804,392

[45] Date of Patent: Feb. 14, 1989

[54] CLEAN AIR FACILITY

[76] Inventor: Charles W. Spengler, 3310 Deforest Ave., Cincinnati, Ohio 45209

[21] Appl. No.: 97,887

[22] Filed: Sep. 17, 1987

[51] Int. Cl.[4] .......... B01D 46/10

[52] U.S. Cl. .......... 55/356; 55/385.2; 98/31.5; 98/115.3

[58] Field of Search .......... 55/356, 385 A, 385 F, 55/472; 98/31.5, 115.3

[56] References Cited

U.S. PATENT DOCUMENTS

| | | | |
|---|---|---|---|
| 3,355,230 | 11/1967 | Trexler | 55/385 A X |
| 3,505,989 | 4/1970 | Truhan | 55/385 A X |
| 3,766,844 | 10/1973 | Donnelly et al. | 55/385 A X |
| 4,202,676 | 5/1980 | Pelosi et al. | 55/356 X |
| 4,304,224 | 12/1981 | Fortney | 55/385 A X |
| 4,553,992 | 11/1985 | Boissinot et al. | 55/279 |
| 4,604,111 | 8/1956 | Natale | 55/385 A X |
| 4,622,950 | 11/1986 | Greenbaum | 52/63 X |
| 4,682,448 | 7/1987 | Healey | 52/63 |

OTHER PUBLICATIONS

"Kontrol Kube", Fiberlock Technologies Co., Inc.

*Primary Examiner*—Charles Hart
*Attorney, Agent, or Firm*—Edwin E. Greigg

[57] ABSTRACT

An environmental clean air facility formed of a clear vinyl material secured to a frame formed by PVC pipes and fittings so that the clear vinyl material may be formed and draped over or attached to the frame to form a clean air enclosure. A power unit section including a blower motor having a prefilter unit on opposite ends through which air is drawn from the surrounding medium and directs the air through a HEPA filter, through an air delivery duct and into or out of the enclosure. The frame may be used for delivering air to the room or exhausting air from the room.

18 Claims, 3 Drawing Sheets

CLEAN AIR FACILITY

This application is copending with application Ser. No. 925,436, filed Oct. 31, 1986, which is incorporated herein by reference.

This invention is directed to improvements of environmental clean air facilities and more particularly to an environmental clean air facility which is inexpensive to make, relatively light in weight, and easy to assemble which can be constructed on site. Further, the materials for the facility may be easily disposed of, it contaminated.

Heretofore clean environmental rooms have been cumbersome and complicated to assemble, requiring in most cases the services of a trained engineer or mechanic. Normally units are manufactured in a factory using metal fabricating welding machines, and shipped to site and erected by mechanics.

OBJECT AND SUMMARY OF THE INVENTION

It is an object of the invention to provide a clean air room which may be constructed by the use of common, simple tools and in which the room enclosure is made of clear plastic, enabling one on the outside to clearly view the inside of the enclosure.

Another object of the invention is to provide a facility which is easily assembled by non-skilled persons to provide a clean air space.

Still another object of the invention is to provide a clean air room which is formed substantially of an all plastic material construction which may be assembled by use of double faced adhesive tape with a peel away covering with the use of VELCRO for closing openings used as doors or access to the inside.

It is yet another object of this invention to provide a clean air enclosure within which a person may work or within which a person may extend their arms through suitable openings for work on the inside of an environmentally clean room.

While yet another object of the invention is to provide a facility by which air flow may be controlled and either positive or negative pressure may be developed within the enclosure.

These and other features and advantages of the present invention will become more obvious from a reading of the following disclosure including the drawings.

DETAILED DESCRIPTION

Figure 1:
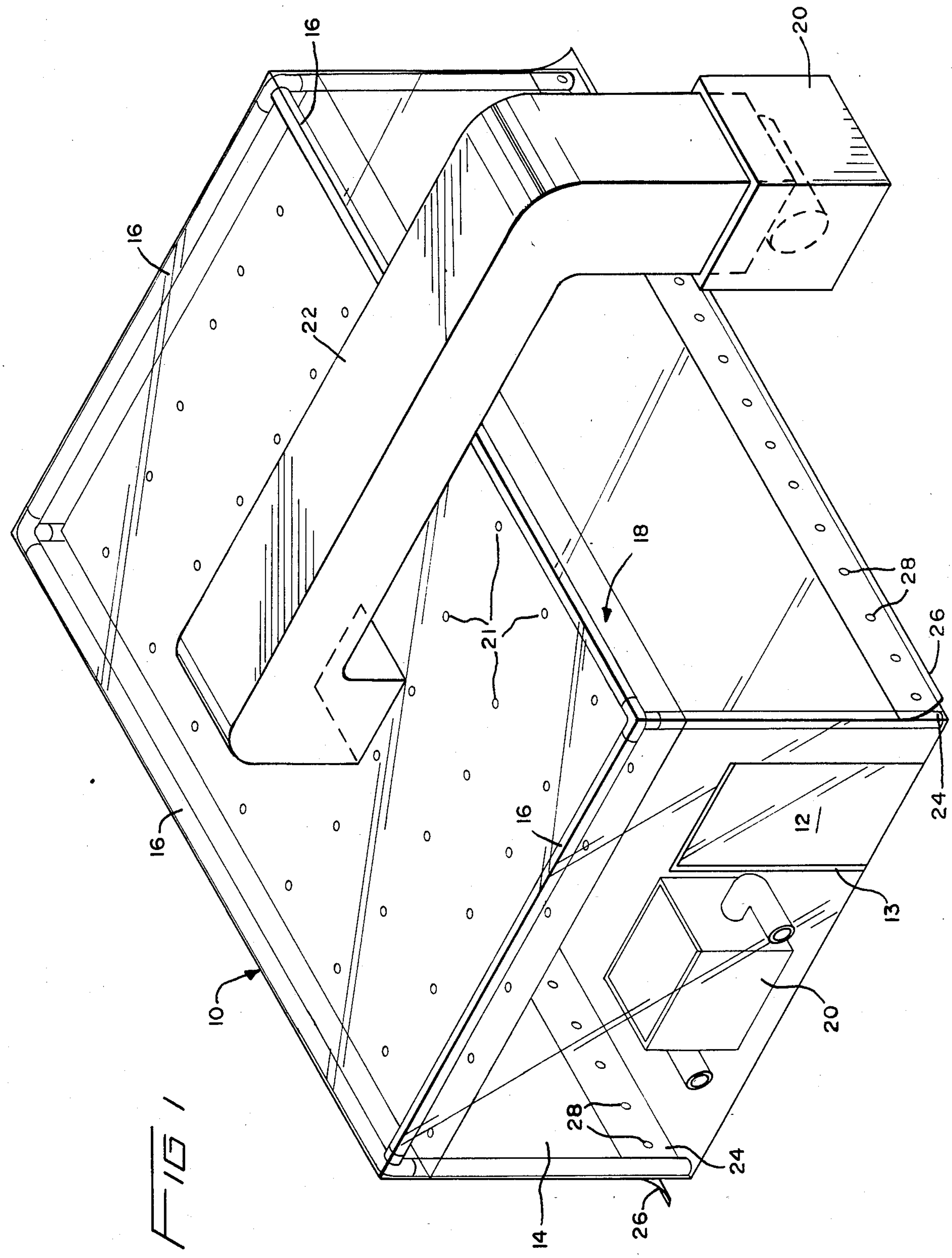
FIG. 1 illustrates an environmentally clean air room having a positive air pressure.
Figure 2:
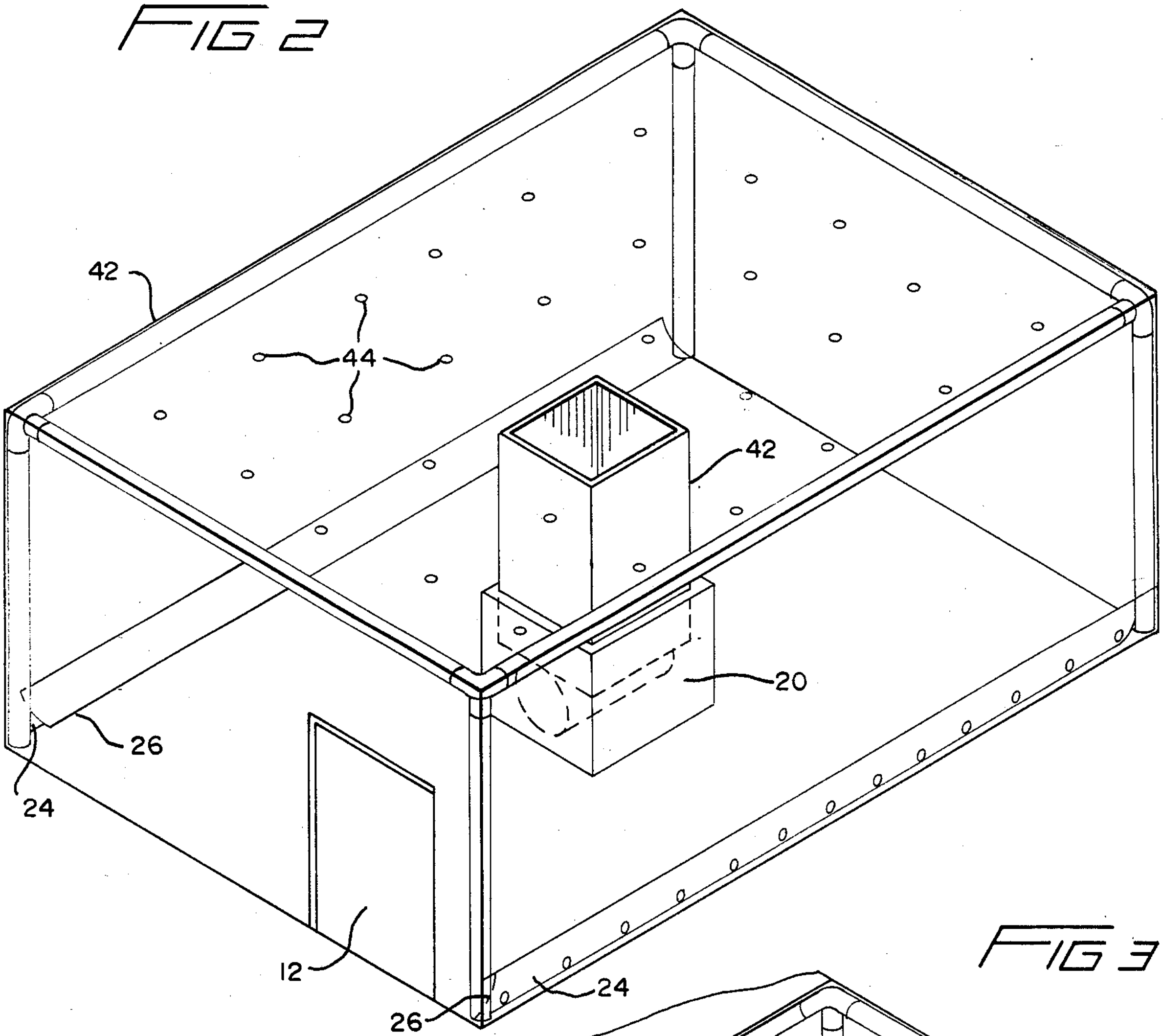
FIG. 2 illustrates an environmentally clean air room with negative pressure.

FIG. 1 illustrates an environmentally clean air room 10 having at least one entrance 12 formed by vinyl surrounded by VELCRO 13 or flexible adhesive magnetic strips. The room is formed on the top and sides by sheeting of clear vinyl 14 which may be secured together at any connecting parts by double faced adhesive tape from which a protective covering has been peeled away. The room may be supported by smooth PVC plumbing type tubes 16 with proper fittings to form joints. The frame may be on the outside with the vinyl room structure supported by the frame or the frame may be on the inside with the vinyl room covering the frame. When the vinyl covers the frame, the frame could be used for applying a negative or positive pressure by pumping air from the room or adding air to the room through the PVC tubing, if desired. Further, the PVC tubing frame may be used to direct air from or to specific locations for freestanding environmental chambers such as set forth in U.S. Pat. No. 4,528,941, for central vacuuming for higher or lower air pressure and/or for fluid transportation in or out of the enclosure.

As shown, the room is provided with a false ceiling 18 into which clean air is blown by a filter-blower 20 through a connecting vinyl tube 22. The false ceiling has spaced apertures 21 through which air is blown downwardly into the clean air room.

As shown, the room is provided with a vinyl-tee footer at the bottom by which the room walls may be secured to the floor. The vinyl-tee has one tee end 24 secured to the floor and one tee end 26 that moves out due to the pressure and which folds along-side the side 24 when there is no pressure applied to prevent air reversal. The tee end 24 is provided with apertures 28 through which air flows when a positive pressure is applied to the room. When using the room for positive pressure with a pump pumping air into the room through the roof or sides one could have a vacuum pump connected to the tubing where the tubing could be used for evacuating the area. One of the advantages of securing the clean air room on the inside of the frame is that if the room becomes contaminated during use, the room may be disposed of. In this case, the frame will not be contaminated. Thus, the expense of the frame will be saved.

A positive pressure clean air room may be used for experimentation by personnel within a clean environment contained with the room. Thus, the room will be formed and secured by the PVC tubing and clean air will be directed into the room from the outside by use of the filter-blower unit 20 having opposite end filters through which the air is drawn and directed through carbon filtration or a HEPA filter as set forth in application Ser. No. 925,436 filed Oct. 31, 1986. The power unit is formed using a clear plastic covering so that the filters, etc., can be visually inspected in place.

The room structure as shown in FIG. 1 may be used with negative pressure for a clean air environment. In this case, the one or more filter-blowers 20 could be operated within the clean air room with a duct running from the filter-blower to the false ceiling. In this operation, the air will be returned to the room via the false ceiling. Since a negative pressure is created on the inside of the room, the tee flap 26, will be pulled against the tee 24 to close the openings 28.

In some instances, there is a need for a negative pressure clean room such as for removing toxic chemical gases, and particulate of liquid aerosols, etc. In this case, a room 40 may be assembled as set forth above, only the tee at the bottom will be reversed so that the loose flap 26 is movable toward the inside to permit air flow into the room. One or more filter blowers 20 are positioned within the confines of the room with a duct 42 connected between the blower and the ceiling. In this case, the duct will be connected to the outside top wall so that air is purified by the filter before it is blown to the outside. The upper wall will have apertures 44 through which air will be drawn into the room. In this case the false ceiling 18 could be dispensed with. Since the room s used to enclose and pump out toxic gases, the air entering the room need not be clean but could be regular outside room air. The idea is to clean the air leaving the room rather than to clean the air entering the room. Once the room facility has been cleared of its toxicity, the room facility blowers and filters should be burned or otherwise disposed of to avoid contaminating personnel. Therefore, if the room has been mounted on the inside of the frame, the frame need not be replaced. However, if the frame is on the inside of a toxic area the frame should also be properly disposed of or properly cleaned, if possible.

Figure 3:
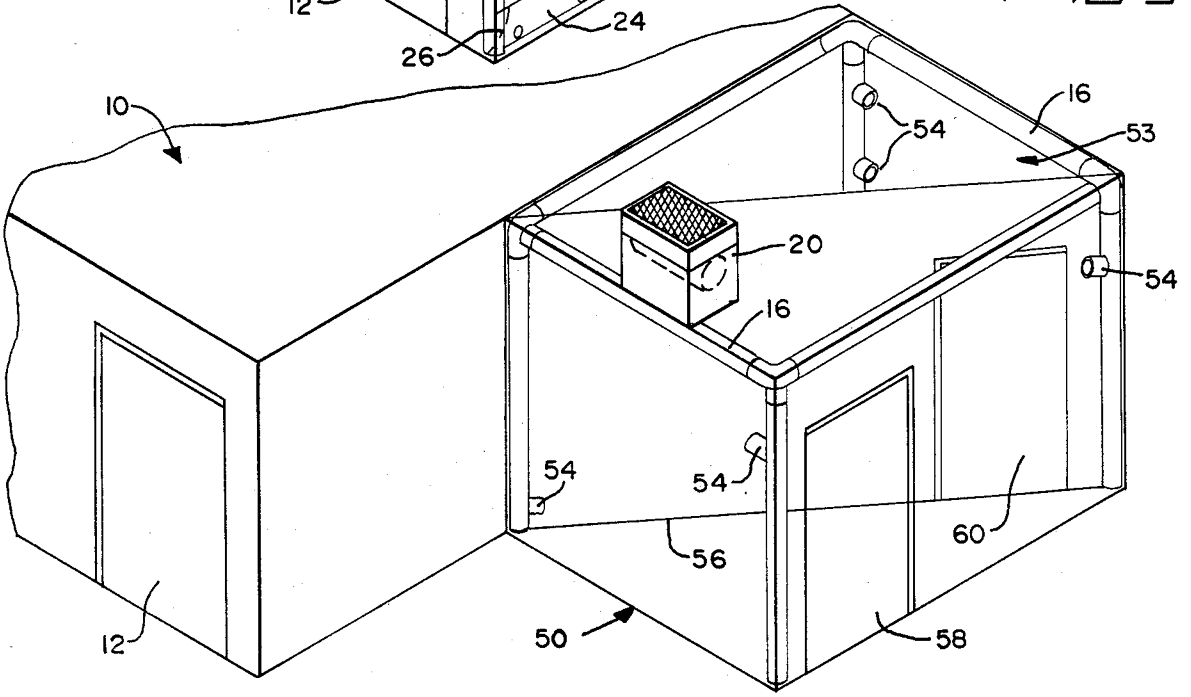
FIG. 3 illustrates a partial environmentally clean air room with negative pressure and with a negative pressure air lock secured to the clean air room.

If the room is used as a clean air environment and the filter blower has been operated sufficiently to insure a clean air environment, it is necessary at times that no air from the outside enter the room as personnel enter or leave the room. Therefore, an air lock 50 may be provided on the outside of the room 10 and connected to a side wall thereof for passage through a door 52 in the side wall. In this case, an air lock as shown in FIG. 3 may be added to a room such as shown in Figure 1. In forming the air lock, PVC tubing 16 is used which has several tee joints 54 directed toward the inside. The plastic shell 53 is placed toward the inside. The plastic shell 53 is placed over the PVC tubing and a blower filter 20 is secured to the top of the shell and frame with the inlet to the blower filter connected to the PVC tubing. Filters are placed in each of the tee joints that opens into the shell so that air within the shell is drawn through the filters by the blower, thus, the air is filtered as it leaves the shell and also as it leaves the blower.

The air lock is formed into two separate room areas by a divider 56 that extends across the shell from wall-to-wall or from the corners on a diagonal. One VELCRO secured door 58 is formed on the outside wall of the shell, one VELCRO door 60 is formed in the partition within the shell and one VELCRO door 52 is formed in the side wall of the clean air room. On entering the clean air room through the air lock, one enters through the outside door 58 to the air lock, closes the door 58 then opens the door 60 in the divider, enters, then closes the door 60, in the divider. In this area, there can be installed a shower for showering and for changing into a non-contaminated uniform. Once the non-contaminated uniform has been donned, the person may enter the clean air room by opening the door 52 in the side wall of the room and then closing the door. The reverse may be done on leaving the clean air room.

In carrying out the teaching of the invention, one may form the vinyl into a desired room shape such as square or rectangular. Then the supporting PVC tubing is assembled of the correct size. If the tubing is to be on the inside of the vinyl room then it is obvious that the length and width be such that the vinyl can fit over the frame. If the frame is on the inside it may be used for producing negative or positive pressure for individual experiments through use of the PVC piping. Such a use is shown in applicant's U.S. Pat. No. 4,528,941. In use for toxic gases or contaminated substances where the vinyl, etc., needs to be disposed of after use, the framing should be on the outside of the environmental room so that the framing need not be disposed of.

The positive and negative pressure rooms have been described as using a vinyl-tee connection along the bottom of the room. The bottom of the room could be connected to the floor by double sticky tape and the apertures shown in the vinyl-tee could be formed along the bottom of the wall or the floor may be of same vinyl then the room would have roof, walls and floor of vinyl.

Further, when using a vinyl-tee as set forth, a filter material could be placed along the apertures to filter out any contaminants. Obviously a filter material may be formed along apertures on the walls and/or in the top of the room shown with a negative pressure. Instead of the apertures along the bottom of the positive or negative pressure room and the air lock the bottom of the wall could hang loose so that air could flow either way from under the walls.

In assembly, the frame is put together by use of appropriate PVC tubing and fittings for either inside or outside assembly of the vinyl room. When assembled on the inside of the frame, the vinyl is formed into the room shape and may be placed on the floor within the frame. A filter-pump may be connected to the vinyl and air may be blown into the vinyl structure which blows up the structure as the air enters. Once the vinyl bubble has reached the height of the frame the bubble may be secured to the frame. Thus, the air lifts the vinyl which then does not need mechanics to lift the vinyl structure. In this structure the bottom of the vinyl should be secured to the floor without any leakage. If the vinyl bubble is lifted in this manner clean air will be in the facility when it is fitted in place. Such an assembly will avoid any punctures from lifting the vinyl assembly.

The clean air facility could be used to house separate laboratories which could themselves be self contained. Each laboratory could have a vinyl enclosure with its own filter-air blower unit. In a self contained laboratory, the blower filter could be in the bottom area of the enclosure with air being drawn through an end filter and blown out through the other end filter into a vinyl channel or passage connected to a false ceiling. The false ceiling would have apertures in the lower vinyl covering of the false ceiling to permit clean air to flow back into the enclosure. The air would then be recirculated through the filter blower to the false ceiling and back again to produce a neutral pressure within the enclosed laboratory.

From the above description of the different pressure arrangements it is obvious that clean air rooms or enclosures of different sizes may be made which are used for positive negative or neutral pressure. Fresh clean air may be added to an enclosure or contaminated air within an enclosure may be cleaned before exhausted or blown into the surrounding air, positive, negative and or neutral enclosures may be formed within a clean air facility wherein the clean air facility and the enclosure therein may be operated separately from the clean air facility by use of separate independent blower-filters or exhaust devices inside or outside of the enclosure within the clean air facility.

Normally, the clean air facility will be operated with the blower-filter unit on the inside for negative pressure and with the blower-filter unit on the outside for positive pressure. However, the blower-filter unit may be on the inside or outside for either situation provided the air flow is proper.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A portable clean air facility which includes:

a support frame;

said support frame including front and rear end vertically directed spaced uprights and horizontally directed spaced upper cross pieces that separate said front end from said rear end;

an enclosure including an upper panel, a front end panel, a rear end panel and opposite side panels each formed by clear vinyl sheeting adapted to be secured to each other in an air tight manner by use of compatible fastening means and secured to said support frame;

at least one door formed of a vinyl sheet secured to an opening in one of said panels by use of Velcro applied to edges of said opening and said vinyl sheet;

said enclosure includes a tee-shaped footer for securing said enclosure to a supporting floor and for admitting or exhausting air from said enclosure; and means for directing clean air into or out of said enclosure.

2. A clean air facility as claimed in claim 1, in which said support frame is formed of PVC tubing and fittings.

3. A clean air facility as claimed in claim 1, which includes an air filter blower for directing air into or from said enclosure.

4. A clean air facility as claimed in claim 2, which includes an air filter blower for direction air into or from said enclosure.

5. A portable clean air facility as set forth in claim 2 in which;

said PVC tubing is used for applying a negative or positive pressure to said clean air facility by pumping air from said clean air facility or adding air to said clean air facility through said PVC tubing.

6. A clean air facility as claimed in claim 1, in which:

said enclosure includes a false ceiling through which air is directed into said enclosure.

7. A clean air facility as claimed in claim 1, in which:

said enclosure includes a false ceiling through which air is directed into said enclosure.

8. A clean air facility as claimed in claim 1, in which:

said upper panel includes spaced apertures through which air is directed into said enclosure.

9. A clean air facility as claimed in claim 1, in which:

said upper panel includes spaced apertures through which air is directed into said enclosure.

10. A clean air facility as set forth in claim 1, which includes:

an air lock through which said enclosure is entered.

11. A clean air faciltiy as set forth in claim 3, which includes:

an air lock through which said enclosure is entered.

12. A clean air facility as set forth in claim 1, in which:

said means for directing air into said enclosure is a filter-blower on the outside of said enclosure and connected thereto by a vinyl hose.

13. A clean air facility as set forth in claim 1, in which:

said means for directing air from said enclosure is a filter-blower on the inside of said enclosure and connected to a panel for forcing air from said enclosure.

14. A clean air facility as set forth in claim 10, in which said air lock is subjected to a negative pressure on its inside.

15. A clean air facility as set forth in claim 10, in which said air lock is subjected to a positive pressure on its inside.

16. A portable clean air facility as set forth in claim 1 which includes;

at least one separate clean air room housed within said portable clean air facility, said clean air room including a separate filter-air blower unit.

17. A portable clean air facility as set forth in claim 16 in which;

said clean air facility is at a positive pressure and said clean air room therein is at a negative pressure.

18. A portable clean air facility as set forth in claim 16 in which said clean air facility is at a negative pressure and said clean air room therein is at a positive pressure.

* * * * *